Jan. 27, 1925.  
A. O. ABBOTT, JR  
1,524,467  
TIRE BUILDING DRUM  
Filed Jan. 12, 1924  
2 Sheets-Sheet 2

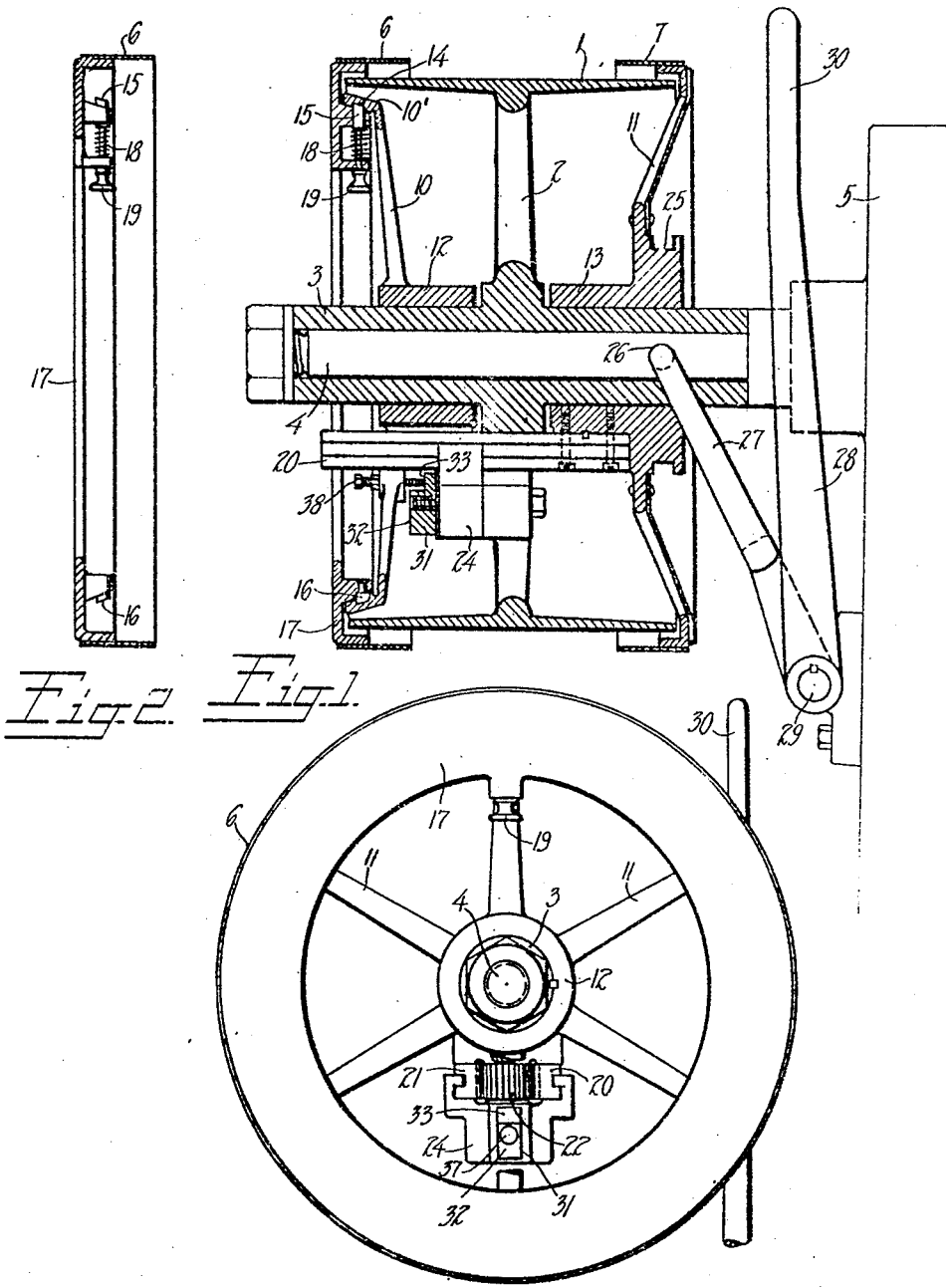

INVENTOR.  
ADRIAN O. ABBOTT, JR  
BY Ernest Hopkinson  
HIS ATTORNEY

Patented Jan. 27, 1925.

1,524,467

UNITED STATES PATENT OFFICE.

ADRIAN O. ABBOTT, JR., OF DETROIT, MICHIGAN, ASSIGNOR TO MORGAN & WRIGHT, OF DETROIT, MICHIGAN, A CORPORATION OF MICHIGAN.

TIRE-BUILDING DRUM.

Application filed January 12, 1924. Serial No. 685,737.

*To all whom it may concern:*

Be it known that I, ADRIAN O. ABBOTT, JR., a citizen of the United States, and a resident of Detroit, county of Wayne, and State of Michigan, have invented a certain new and useful Tire-Building Drum, of which the following is a full, clear, and exact description.

This invention relates to the manufacture of tires, and more particularly, an apparatus for building them with dispatch in "pulley-band" form.

In the manufacture of clincher casings, it is usual and desirable to locate plies of stock (usually a rubberized fabric, woven or weftless), so as to substantially completely encircle the beads (usually made of semicured rubber, more or less hard) by passing some of the plies underneath the beads and others around and outside the beads. These latter (outside) plies have to be stretched or "fulled" marginally and laid on so as to follow the contour of the bead. As the materials are rubber in incompletely vulcanized form and tacky, difficulty is experienced in the operation.

The present invention aims to provide an apparatus facilitating the building in of the beads, more particularly, applying plies of fabric to them. It further aims to provide an apparatus in which the bead incorporating operations may be performed, while the drum is revolved, with greater uniformity, and in a more foolproof manner.

A preferred embodiment of the invention is illustrated in the accompanying drawings, in which:—

Figure 1 is a vertical section of a building drum with separating members or rings in working relation therewith;

Figure 2 is a section of the left-hand or removable ring;

Figure 3 is an end elevation of Figure 1;

Figure 8:
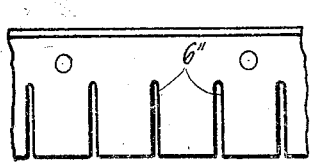

And Figure 8 illustrates still another modification of separating member or ring.

In the drawings, a building drum is indicated generally by the numeral 1. It is shown made of non-collapsible form for the sake of clearness but it may be made collapsible, if desired, and as is preferable in practice. The drum has, preferably, a cylindrical face on which the constituents of the tire are built, and which is supported by spokes 2 from a hub 3 fast on a shaft 4 extending from a frame or housing 5, within which are located rotating starting and stopping mechanisms of any suitable type, such for instance as that disclosed in patent to Hopkinson, No. 1,310,701, granted July 22nd, 1919.

Figure 4:
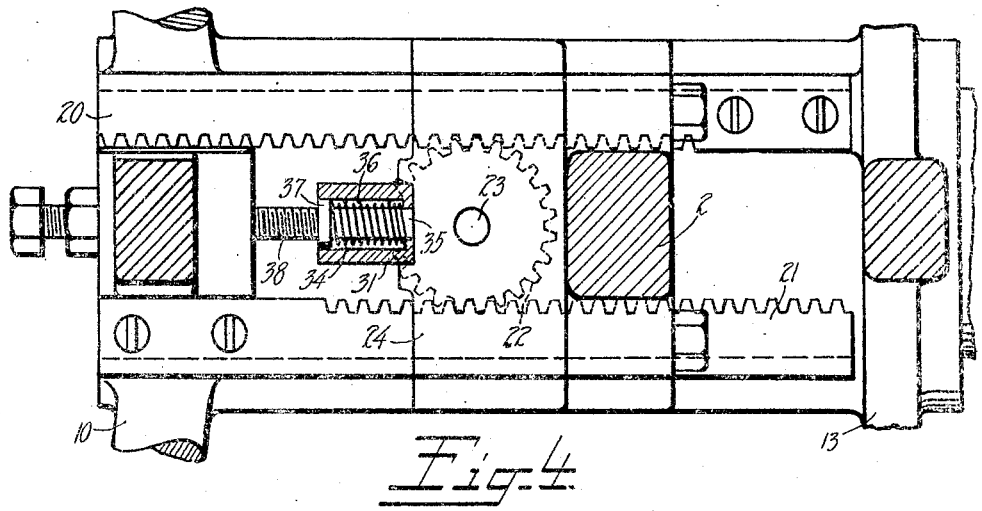
Figure 4 is a detail, partly in section, showing racks, etc., for equalizing movement of the separating members or rings.
Figure 5:
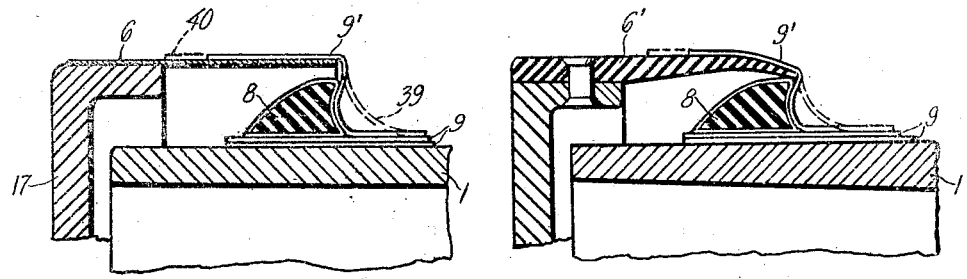
Figure 5 is a fragmentary section on a large scale, illustrating the manner of applying stock.
Figure 6:
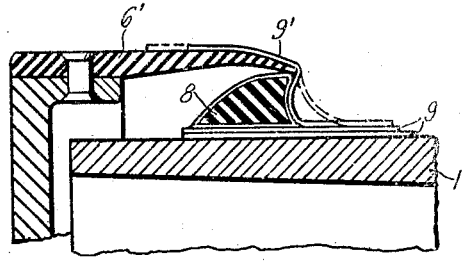
Figures 6 and 7 illustrate a modified form of separating member or ring in working and non-working relation, respectively, to a building drum.
Figure 7:
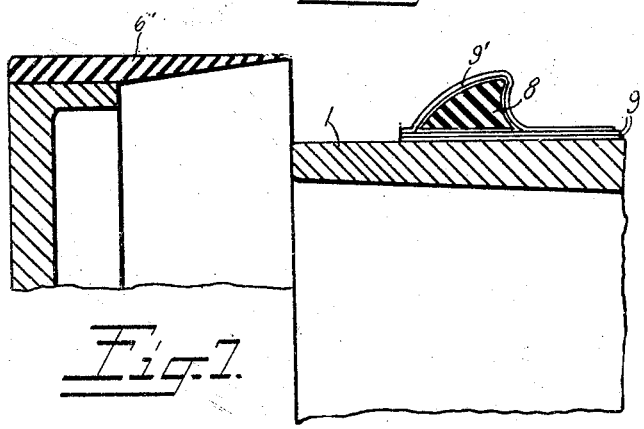

At opposite sides of the drum are separating members or rings 6 and 7, which may be made of metal and fairly stiff, as indicated in Figures 1 and 2, or may be made flexible, either out of vulcanized rubber, as indicated at 6′ in Figures 6 and 7, or out of a sheet metal ring provided with slots, as indicated at 6″ in Figure 8. If desired, the projections of the slotted form of separating member or ring may be bent downward at their free ends. But any material may be used and any shape may be given to the separating members or rings 6 and 7, the forms illustrated being merely specific embodiments. In all cases, however, the separating rings are preferably made of a girth greater than that of the building drum by at least twice the thickness of the beads which are indicated at 8 in Figures 5, 6 and 7 of the drawings. In other words, the ply separating members or rings are, in all cases, of a size and shape permitting them to overhang the beads after the latter have been applied to the inner plies or fabric laminations 9, which are mounted directly on the building drum 1.

While the separating members or rings 6—7 may be supported in many different ways without departing from the principles underlying the invention, it has been found convenient to sustain them on spiders 10 and 11, whose hub portions 12 and 13 are slidable (feathered) on the hub 3 of the building drum 1. The separating member or ring 7 which is nearest the housing 5 is preferably secured permanently to its spider 11, but the other separating member or ring 6 is preferably secured demountably to its spider 10. To this end, the annular flanged periphery 10' of the spider 10 is preferably provided with a groove or notch 14 for the reception of pins 15 and 16. The latter is permanently secured to the ring-plate 17, but the former, i. e., pin 15, is preferably of a detent type having a coiled spring 18 and knob 19 by which it may be withdrawn and the ring-plate 17 demounted or removed bodily from its spider 10. This demountable construction permits a completely built tire-band to be readily removed.

While the separating rings 6 and 7 may be shifted transversely of the drum, manually or independently or dependently in any suitable manner, to and from the overhanging or working relation with the drum in which they are shown in Figure 1, it is preferred to shift them equally in opposite directions by a single lever. And for this purpose, racks 20 and 21 are fixedly secured to the hub portions 13 and spider arms 10, which support the respective separating members or rings 7 and 6. Intermediately a pinion 22 in mesh with the racks is rotatably supported on a pin 23 anchored in a block 24 fastened rigidly and permanently to the hub 3 of the building drum 1, between its spokes 2. If one of the separating rings is moved, of necessity, the other moves equally and oppositely. To effect movement, any means may be provided, such as the groove 25 (in an enlarged portion of the hub 13) in which are received the inward bent ends 26 of a fork 27, constituting one arm of a bell-crank lever 28, which is fulcrumed at 29 and has an operating handle 30. By manipulating the handle 30, the two separating rings 6 and 7 may be approached or separated equally in opposite directions.

It is desirable, at least some times, to make different widths of pulley-bands on the same drum. And in such cases, it is desirable to stop the approach of the separating members or rings 6 and 7 at different distances apart. To this end, a block 31 having two steps or faces 32 and 33 is frictionally secured by a coiled spring 34 which encircles a pivot pin 35 permanently attached to the before-mentioned block 24. The block 31 is suitably counter-bored, as at 36, to accommodate the spring, one end of the pin 35 being provided with a head 37 affording a rigid abutment for the spring 34 which presses against the bottom of the bore 36. And in this way, the block 31 is frictionally held against the face of the block 24. Either of the faces or steps 32 and 33 may be presented to the stop-screw 38, which is adjustably secured in one of the arms of the spider 10.

In operation, the stock or plies are drawn from a suitable source and applied centrally to the cylindrical surface of the drum 1. This is done when the separating members or rings 6 and 7 are removed or shifted off to one side, as indicated for instance in Figure 7 of the drawings. When the necessary number of plies have been built up on the drum, beads 8 are then applied about as shown in Figures 5, 6 and 7 of the drawings. Then the operator manipulates the handle 30 of the bell-crank lever 28 so as to bring the separating members or rings 6 and 7 to the position about as shown in Figure 1 of the drawings. Thereafter, one or more stock or ply 9' is applied to the drum, first being rolled down intermediately with as little stretch as possible and attached to the underlying plies 9. The margins of ply 9' will assume a position about as indicated in dotted lines at 39 and 40, Figure 5. This provides ample fullness to allow the fabric to be moved in with a suitable tool while the building drum is rotated to the solid line position indicated in Figure 6. In doing this, of course, the edge 40 of the ply 9' is moved from the position indicated in dotted lines to the position indicated in solid lines, Figure 6. This done, the operator removes the separating members or rigid rings 6 and 7, and completes the application of the stock or ply to the beads 8. The separating members or rings 6 and 7 are then restored to the working relation shown in Figure 6 and the operation repeated for other plies, as required, the number depending upon the construction of the particular tire being built. When the tire-band has been completed, the outer separating member or ring 6 is bodily removed, by suitable manipulation of the spring detent 15, the tire-band removed. The separating member or ring 6 may be restored at any convenient time prior to laying the plies over the outside of the beads.

In the foregoing, the invention has been detailed with a view to disclosing to one skilled in the art all that is necessary for a complete understanding of its underlying principles. It will be understood that these may be embodied in various forms of construction other than those illustrated and described, and reference is therefore made to the accompanying claims for an understanding of the full breadth and scope of the invention which is not limited to treatment of one ply at a time as two or more may be temporarily supported and "fulled" or stretched marginally if desired and feasible with the stock or ply material used.

Having thus described my invention, what I claim and desire to protect by Letters Patent is:—

1. The combination with a tire building drum, of members for supporting the margins of plies whose intermediate portions are applied directly to the drum, the radial distance from the axis of the drum to said supporting members, being greater than that to the surface of the drum.

2. The combination with a tire building drum, of members for supporting the margins of plies whose intermediate portions are applied directly to the drum, the radial distance from the axis of the drum to said supporting members being greater than that to the surface of the drum, said members being shiftable transversely of the drum.

3. The combination with a tire building drum, of separating members overhanging the margins of the drum at a radial distance therefrom accommodating a bead between said separating members and the drum, one of the members being demountable.

4. The combination with a tire building drum, of a pair of ply-separating members of a diameter greater than the drum, means supporting the members for movement at will to and from overhanging relation with the drum, and means permitting removal of one of said ply-separating members from the building drum.

5. The combination with a tire building drum, of a pair of ply-separating members of a diameter greater than the drum, means supporting the members for movement at will to and from overhanging relation with the drum and for movement equally in opposite directions, and means permitting one of the members being removed to a position not obstructing removal of a completely built tire-band.

6. The combination with a tire building drum, of a pair of ply-separating members of a diameter greater than the drum, and means supporting the members for movement at will to and from overhanging relation with the drum, one of said ply-supporting members being demountable to permit removal of a completely built up tire-band.

7. The combination with a tire building drum, of a pair of members for temporarily supporting and stretching the margins only of a ply or plies of stock which intermediately may be applied without stretching to said building drum, means for shifting said members transversely of the drum, and an adjustable stop for limiting approach of said members in pre-determined spaced relations overhanging the drum, one of said members at least being shiftable independently of the other to permit removal of a completed tire-band.

Signed at Detroit, county of Wayne, and State of Michigan, this 7th day of January, 1924.

ADRIAN O. ABBOTT, Jr.